March 28, 1967   P. M. ERLANDSON ETAL   3,310,972
MOVING HYDRAULIC IMPULSE METAL FORMING DEVICE
Filed Nov. 10, 1964   3 Sheets-Sheet 2
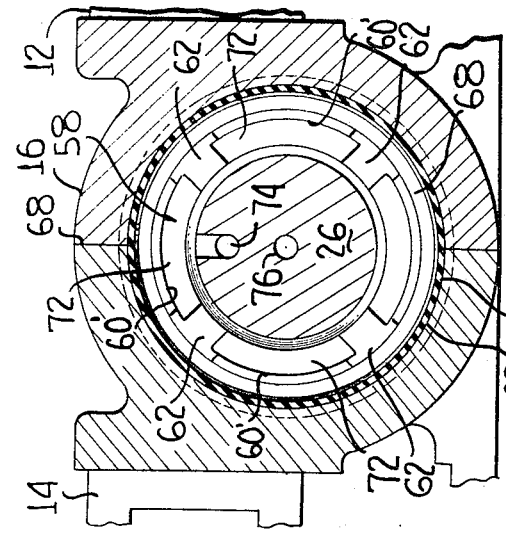
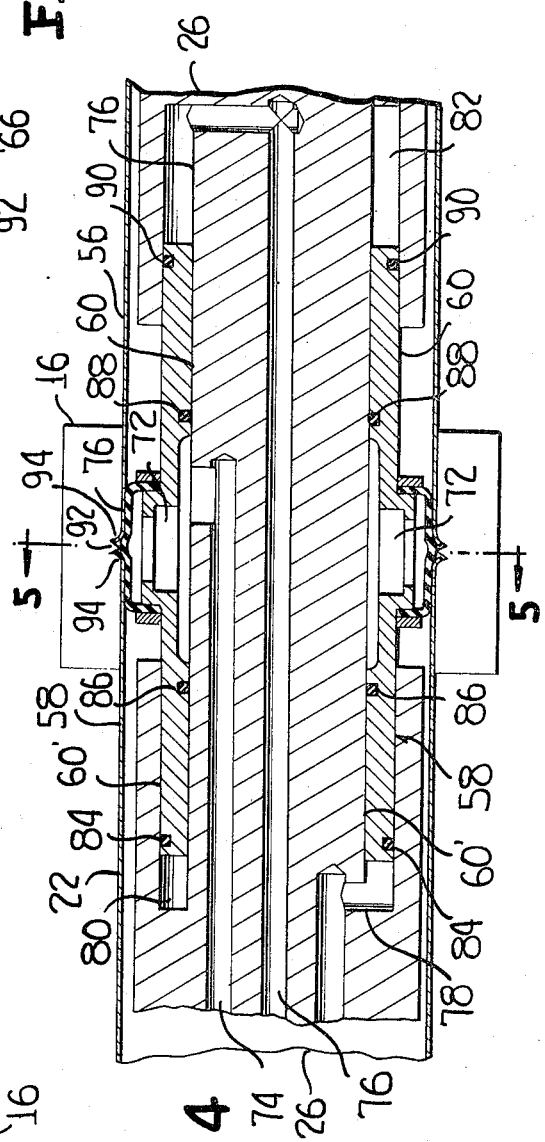
INVENTORS
PAUL M. ERLANDSON
& DONALD J. ROTH
BY
ATTORNEYS

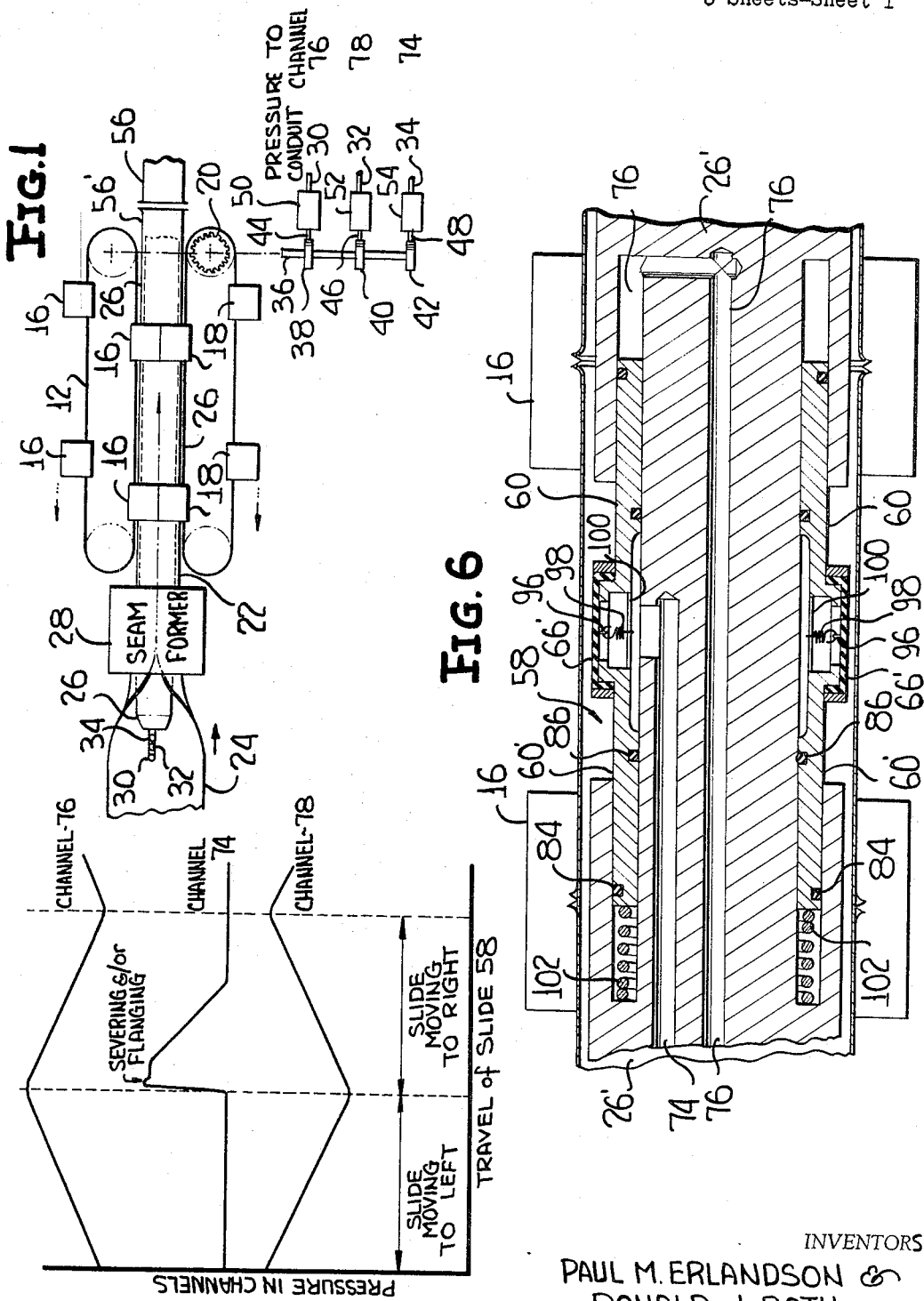

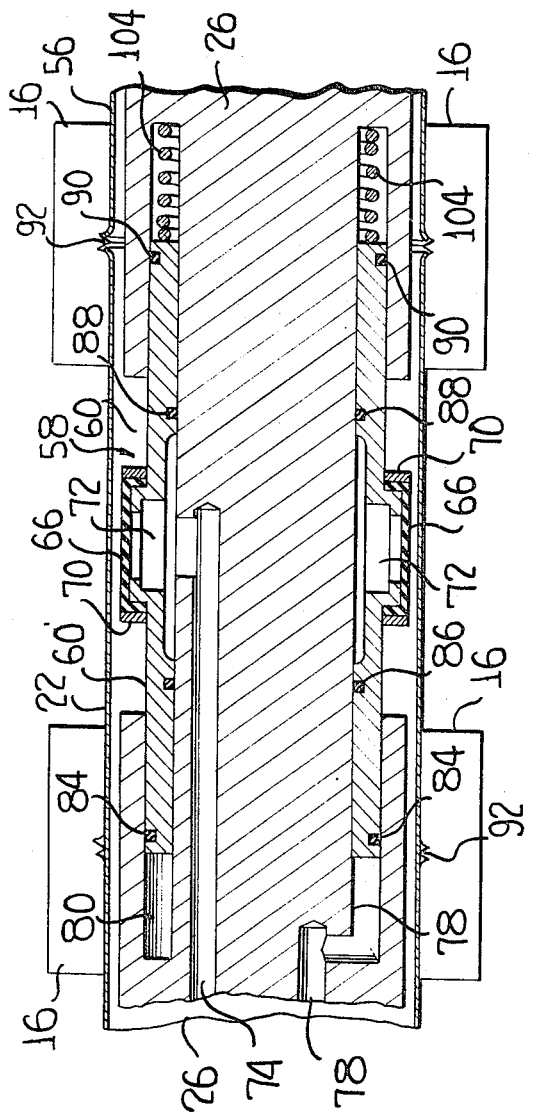
FIG.7
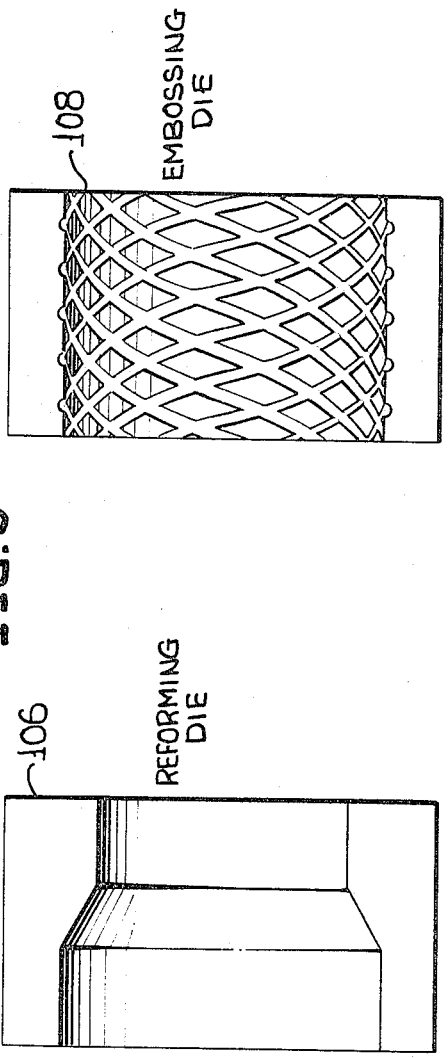
FIG.9 EMBOSSING DIE
FIG.8 REFORMING DIE
INVENTORS
PAUL M. ERLANDSON &
DONALD J. ROTH
BY
*Mason, Porter, Diller & Stewart*
ATTORNEYS United States Patent Office 3,310,972
Patented Mar. 28, 1967

3,310,972
MOVING HYDRAULIC IMPULSE METAL
FORMING DEVICE
Paul M. Erlandson, Palos Park, and Donald J. Roth,
Chicago Heights, Ill., assignors to Continental Can Company, Inc., New York, N.Y., a corporation of New York
Filed Nov. 10, 1964, Ser. No. 410,833
32 Claims. (Cl. 72—55)

This invention relates to a hydraulic impulse metal forming device and more specifically to means for performing operations on continuously moving tubing by the application of pressure to a flexible membrane which drives the tubing against a forming die to result in the desired operation.

The desired operation may be one of severing, severing and flanging, embossing or reforming.

In the fabrication of containers, whether of metal, plastic, paper, etc., ease of fabrication and speed with which the various fabrication steps are accomplished, are paramount. Of course, further considerations include economies of operation and the adherence of the finished product to predetermined specifications. Well known techniques for the fabrication of containers include the formation of container blanks which are then processed to form the container bodies. This method involves at least two distinct and time-consuming steps: the severing of the blanks from the stock material; and, the forming of the container bodies. In addition, it will be understood that a number of other steps are necessary before a container body is produced.

It has been proposed that a savings in time would be effected by forming a tube directly from the stock material, thus avoiding the step of individually severing the blank from the stock material. In producing container bodies by this technique, the continuous tubing would be severed at appropriate intervals to produce the container bodies. The severing of the continuous tubing introduces many problems. The tubing would be stopped or at least retarded in its travel during the severing operation. In addition, incomplete severing would defeat truly successful operation.

The present invention proposes that container bodies be formed from a continuously moving tubing by severing and/or flanging the tubing at appropriate intervals while the tubing continues at its regular pace and without any retardation in the speed thereof. Further, the invention proposes that embossing and other reforming operations be performed upon the container body (or even upon the tubing without severing) at rates commensurate with the the advancement of the tubing.

Accordingly, it is the principal object of the present invention to improve container forming techniques.

Another object of the present invention is to increase the speed of container forming processes.

A further object of the present invention is to provide a more economical means for forming container bodies.

A further object of the present invention is to provide a means for forming container bodies of metal having any electrical conductivity.

A further object of the present invention is to provide a means for forming container bodies of plastic, paper, etc.

A further object of the present invention is to provide a means for forming container bodies while being continuously advanced in a container forming line.

A further object of the present invention is to provide a means for forming container bodies while being continuously advanced by including a movable forming means within the tubing to advance with the tubing during the forming process.

These and other objects of the present invention are accomplished by providing a tube forming line for forming a substantially flat but continuous strip of material into a tube of the desired diameter. Means are included for effecting a seal of the two edges of the tubing. The tubing is advanced by a conveyor means which includes a plurality of pairs of split dies coupled to the conveying means and advanceable at the same speed as the tubing. The pairs of dies are in a spatial relation equal to the desired container body length. Within the tubing and the area where the split dies are in engagement, a horn is positioned. The horn has a stationary portion and a movable or slidable portion. The slidable portion operates in reciprocal motion. During its forward motion, the tubing is acted upon. During its return motion, the slide returns to align a flexible membrane with the next pair of split dies.

Positioned about a portion of the periphery of the slidable portion of the horn, is the resilient means, such as the flexible membrane, which may be extended radially to sever, flange, reform or emboss a container body. These operations are accomplished in the following manner. As the unsevered tubing advances over the horn, the slide mechanism bearing the resilient or flexible membrane is also driven and to a position in which the membrane is aligned with an approaching pair of dies on the conveyor. The flexible membrane is then caused to be abruptly driven outwardly to force the tubing into the contours of the die, whether it be a severing die, a severing and flanging die, a reforming die or an embossing die, to result in the desired operation. The slide bearing the flexible membrane advances with the tubing for a short distance before its direction is reversed in order to meet the next pair of split dies as they approach the slidable unit. The formed container then continues on and is discharged from the system at the point where the pair of split dies separate. The reciprocating action of the slide and the radial movement of the flexible membrane may be accomplished in any desirable manner such as hydraulically, by resilient means such as springs, by a combination of these, etc. In addition, modifications are envisioned where a plurality of slides and flexible membranes may be utilized in a system where severing and/or flanging would precede an embossing or reforming operation.

The invention both as to its organization and method of operation together with further objects and advantages thereof will best be understood by reference to the following specification taken in conjunction with the accompanying drawings, in which:

FIGURE 1 is a plan view of a continuously moving tubing and die line for forming container bodies;

FIGURE 2 is a graph showing related pressures for operating the forming means of the system;

FIGURE 3 is a longitudinal sectional view showing the forming means within the tubing being returned to engage and advance with a moving split die;

FIGURE 4 is a longitudinal sectional view similar to FIGURE 3 but showing the forming means engaging the tubing and a die and advancing therewith;

FIGURE 5 is a transverse sectional view taken along the line 5—5 of the FIGURE 4;

FIGURE 6 is a longitudinal sectional view of another embodiment of the forming means within the tubing of the FIGURE 3;

FIGURE 7 is another embodiment of the forming means within the tubing of the FIGURE 3;

FIGURE 8 is an elevational view of one-half of a split reforming die that may be employed in the practice of the invention; and FIGURE 9 is an elevational view of one-half of a split embossing die that may be employed in the practice of the invention in the FIGURE 1.

With reference to the FIGURE 1, a conveying means 12 rotates in a generally counter-clockwise motion and meets with a second conveyor means 14 which rotates in a generally clockwise fashion. Supported upon the conveyor means 12 are a plurality of split dies 16 which form one-half of a die forming member. Similarly, there is mounted on the conveyor means 14 a plurality of split dies 18 which are adapted to engage with the split dies 16 along the area in which the direction of advancement of the conveyor means 12 and 14 is the same.

The contiguous split dies 16 and 18 surround a tube 22 which has just been formed from a continuous strip of container body material 24. Positioned within the tubing is a horn 26 which supports a slide means, to be hereinafter described. Positioned above and contiguous to the junction of the two edges of the tubing 22 formed from the continuous strip 24 is a seam former 28 which may be of any conventional design, such as welding, brazing, mechanical, a combination of the foregoing, etc.

The slide, to be hereinafter described, may be actuated by fluid pressure applied to the conduits 30, 32 and 34 shown at the left end of the horn 26 in the FIGURE 1. The pressure to the conduit 30 is the slide reversing channel; the pressure applied to the conduit 32 is the slide advancing channel; and, the pressure applied to the conduit 34 is the flexible membrane pressure channel. Suitable pressures may be generated by the coupling of a shaft 36 from the conveyor advancing means 20. In this, manner, synchronism of the applied pressures with the position of the split dies 16 and 18 is maintained. A plurality of cams 38, 40 and 42 are rigidly positioned and driven by the shaft 36. In engagement with each of the cams 38, 40 and 42 is a cam follower 44, 46 and 48, respectively. Each of the cam followers 44, 46 and 48 controls a fluid reservoir and actuating means 50, 52 and 54, respectively, to supply the appropriate pressures on the conduits 30, 32 and 34, respectively. The use of the pressures for the conduits or channels 30, 32 and 34 will be disccussed hereinafter.

It will be understood that the cams 38, 40 and 42, the cam followers 44, 46 and 48, and the fluid reservoir and actuating means 50, 52 and 54 may be of any suitable design and are shown in block form for illustrative purposes only. In the event that one or more of the channels or conduits 30, 32 or 34 are driven by means other than fluid pressure (for example, by a resilient means such as a spring) then this means for generating the appropriate pressure to the respective channel would be deleted.

In the FIGURE 1, a severed container 56 is shown about to be discharged from the system whereas a container 56' is also being advanced to the right and will be discharged as soon as its associated split dies 16 and 18 are opened by the conveying means 12 and 14. It will be understood that if embossing and/or reforming of the severed container is desired, then the container 56 could be introduced to a conveyor (not shown) which would transport the appropriate embossing or reforming die to perform that operation.

Reference will now be had to the FIGURES 3, 4 and 5 which disclose in detail the forming means of the invention. The FIGURE 3 shows a longitudinal sectional view with the flexible membrane, to be hereinafter described, positioned between one-half of the split dies 16. In the FIGURE 4, the resilient or flexible membrane is being shown in engagement with the tubing 22 and the severing means of a severing and flanging die 16. The FIGURE 5 is a transverse sectional view taken along the line 5—5 of the FIGURE 4.

Briefly, in the FIGURES 3 and 4 the tubing 22 and the die 16 are in continuous and substantially constant velocity toward the right side of the drawings. A slide, generally indicated at 58, reciprocates in such a fashion to move leftwardly in the FIGURE 3 until its center portion, supporting a flexible membrane, is in the position shown in the FIGURE 4. After the flexible membrane has reached the position shown in the FIGURE 4, the movement of the slide is reversed so that it now travels to the right along with the tubing 22 and the die 16. The flexible membrane advances for a short distance at which time an abrupt acceleration of the membrane causes a severing or other operation. After completion of the operation, the slide bearing the flexible membrane is then returned leftwardly to align itself with the next approaching split dies 16 and 18.

The foregoing brief description will now be discussed in detail with reference to the FIGURES 3, 4 and 5. The horn 26 is supported by any suitable means in a stationary position within the tubing 22. Within the horn 26 are formed a labyrinth of passageways which serve to communicate with and position the slide member generally indicated at 58. It will be noted that the slide 58 is circular and moves within the passageways to various positions according to the pressures applied through the passageways to the slide. As best shown in the FIGURES 3, 4 and 5, the slide includes a pair of longitudinal circular elements 60 and 60' with radial spacers 62. To facilitate fabrication, it will be understood that the longitudinal circular elements 60 and 60' could be split and thus assembled into the stationary horn 26. The slide may include a right hand member 60 and a substantially identical left hand member 60'. At the adjacent ends of the longitudinal circular elements 60 and 60' are the raised portions 64 and 64' which support and join the two circular elements 60 and 60' by a flexible membrane 66. The flexible membrane 66 may be of rubber, plastic, or any other suitable material which could be deformed abruptly by any suitable pressure means. The flexible membrane 66 is circular and continuous and has inwardly extending lips 68 which are positioned about and engage the raised portions 64 and 64' of the circular elements 60 and 60', respectively. A clamp 70 may be employed to secure the flexible membrane 66 in position. Within the membrane 67 and surrounding the horn 26 is a chamber 72 which communicates with a channel 74 formed in the horn 26. The channel 74 communicates with the flexible membrane pressure channel or conduit 34 of the FIGURE 1.

A second channel 76 is formed in the horn 26 and conducts fluid substantially through the center of the horn, then radially, and then toward the left to position the slide 58 by the application of pressure to the circular element 60 which slides within the channel 76. The channel 76 communicates with the slide reversing channel or conduit 30 of the FIGURE 1. A third channel 78 is formed in the stationary horn 26 and receives the left end of the circular element 60'. The application of pressure to the channel 78 from the conduit 32 of the FIGURE 1 will cause the slide 58 to move rightwardly. Since the slide 58 reciprocates, portions are removed as required in the horn 26 to accommodate the opposite ends of the elements 60 and 60' to which pressure is not directly applied by the pressure actuating system of the FIGURE 1. These areas are shown at 80 and 82 of the FIGURES 3 and 4 and any pressure build up in the areas 80 and 82 as a result of the reciprocating motion of the slide 58 may be bled off as desired. The ends of the slides form a piston arrangement which are actuated by the application of pressure to be hereinafter described.

From the FIGURES 3 and 4, it will be noted that the portion of the slide designated 60' reciprocates in the cylindrical area 80 which communicates with the channel 78 and a pair of O-rings 84 and 86 are fitted in removed portions of the element 60' to effect a seal between the element 60' and the horn 26. The O-ring 84 is positioned about the outside perhphery of the element 60' whereas the O-ring 86 is positioned about the inside periphery of the element 60'. Similarly, O-rings 88 and 90 are contained in slots or grooves formed in the right-hand element 60 to effect a seal between the circular element 60 and the horn 26.

In the serving and flanging die 16 (which is one-half of the split die 16 and 18) a severing blade or knife 92 is formed on the inside circumference of the die 16. In the portion of the die 16 which is removed to form the severing blade 92, are the flanging radiuses 94 which may be formed to any desired configuration according to the requirements of the flanged edge of the container 56.

In the FIGURE 3, the slide 58 is shown in its intermediate position where it would be moving from right to left and in a direction reversed from the movement of the tubing 22 and the die 16. In the FIGURE 4, the slide 58 is now moving from left to right after having engaged the tubing 22 to force the tubing 22 against the die 16 and the severing blade 92 by action of the flexible membrane 66. Pressure has been applied to the flexible membrane 66 through the channel 74 to drive the membrane 66 into the severing blade 92 and against the flanging radiuses 94 which results in a severed and flanged container body as indicated at 56. Simultaneously, fluid pressure is applied to the channel 78 to cause the slide 58 to advance from left to right at a rate commensurate with the rate of travel of the tubing 22 and the die 16.

In the FIGURE 5, which is a transverse sectional view taken along the line 5—5 of the FIGURE 4, the flexible membrane 66 has driven the tubing against the blade 92 to result in a severing of the tube 22 to result in a container 56, as shown. In the FIGURE 5, the movable portion of the assembly, namely, the slide 58, the dies 16 and 18, and the tubing 22 are depicted as moving perpendicularly out of the drawing. The chamber 72 would be filled with fluid under pressure and momentarily would be reduced in pressure to permit a return of the flexible membrane 66 to its retracted position as shown in the FIGURE 3.

A better understanding of the invention will be had by reference to the graph of the FIGURE 2 which shows the related pressures applied to the channels 74, 76 and 78 by the conduits 34, 30 and 32, respectively. We will assume for the purposes of explanation, that the condition shown in the FIGURE 3 prevails and that a severing and flanging operation has just been performed to result in a container 56. Accordingly, it is now necessary that the slide 58 be driven reversely to the direction of travel of the tubing 22 and the die 16, or from right to left. This operation would be accomplished by the cam 38 of the FIGURE 1 actuating its associated cam follower 44 in such a manner to cause the pressure from the conduit 30 to the channel 76 to increase in a manner as shown in the FIGURE 2 along the curve indicated for the channel 76. The pressure in the channel 76 would be increased thus acting upon the "piston" portion of the circular element 60 (see the FIGURE 3) to result in a movement of the slide 58 from right to left. Assuming that increasing pressures are determined as greater distances from the abscissa, it will be observed that the pressure to the channel 76 increases to a maximum as the slide 58 moves to the left, followed by decreasing pressure as the slide 58 moves to the right. The reduction in pressure in the channel 76 as the slide moves to the right may not be linear as shown since the movement of the slide 58 would now be controlled by pressure applied to the channel 78. Accordingly, the pressure versus travel of the slide 58 shown in the FIGURE 2 are relative and only for illustrative purposes to show increasing or decreasing pressures.

The pressures maintained in the channel 78, as shown by the FIGURE 2, would be complementary to those of the channel 76 since increasing pressure (to drive the slide 58 to the left to the channel 76)' would result in decreasing pressures in the channel 78 as the slide 58 moves leftwardly. As the direction of motion of the slide 58 reverses, an increase in pressure would be applied to the channel 78 to advance the slide 58 to the right while the pressure in the channel 76 would be bled off or reduced as shown.

The pressure to the channel 74 and generated by the cam 52, the cam follower 48 and the fluid reservoir and actuating means 54 to the conduit 34 and then to the channel 74 in the horn 26, is as shown by the middle graph of the FIGURE 2. As noted, the pressure to the channel 74 remains substantially at zero during the movement of the slide 58 from right to left and, shortly, after the movement of the slide 58 is reversed and now follows along with and at a speed commensurate with the tubing 22 and the split dies 16 and 18. A very abrupt increase in pressure is applied to the channel 74 to drive the flexible membrane 66 outwardly and force the tubing 22 into engagement with the forming means of its associated die. During this period, the flexible membrane 66 is in engagement with and travels along from left to right with the tubing 22 and in this manner, abolishes the necessity of stopping the tubing 22 to perform an operation such as severing, flanging, embossing or reforming on the tubing. In the system of the present invention, the motion of the tubing 22 is continuous and at substantially a constant speed throughout the reforming processes.

As noted from the middle graph of the FIGURE 2, after the severing and/or flanging (or embossing or reforming in the event those operations are desired) pressures are applied, the pressure is reduced so that the flexible membrane 66 may return to its normal, unstretched position and disengage the tubing 22. Shortly thereafter, the pressure in the channel 74 returns to substantially zero and the cycle repeats.

To summarize the operation of the system, reference will be had to the FIGURES 1, 2, 3 and 4. With reference to the FIGURE 1, we will assume that the system is in continuous operation and that the tubing 22 is being advanced at a rate commensurate with the split dies 16 and 18 by the means indicated at 20. In addition, we will assume that the proper synchronization is being maintained by the cams 38, 40 and 42 to generate the desired fluid pressures through the conduits 30, 32 and 34 to the channels 76, 78 and 74, respectively, for operating the slide 58. From the FIGURE 3, we will conclude that the severing of the tubing 22 has just occurred with the resultant forming of the container 56, as shown. It is now necessary that the slide 58 be returned from right to left to engage the tubing 22 with the leftmost die 16 in the FIGURE 3 as it approaches the severing and/or flanging area. Accordingly, an increase in pressure is applied through the channel 76 to force the slide 60 to the left. It will be noted that the pressure in the channel 78 is being reduced to permit the return of the slide 58. As soon as the slide 58 has reached the furthest extent of its leftward travel, pressure will increase to the channel 78 and decrease to the channel 76 as shown by the FIGURE 2. The application of these pressures results in a reversal of the movement of the slide 58, which now travels from left to right at a velocity commensurate with and in alignment with the die 16 and the tubing 22. Shortly after the reversal of the motion of the slide 58, an abrupt increase in pressure is applied to the channel 74 to force the flexible membrane 66 (FIGURE 4) into engagement with the tubing 22 and the die 16. It will be noted that the synchronism between the movement of the flexible membrane 66 and the tubing 22 and the die 16 is not critical in that the width of the flexible membrane 66 greatly exceeds the severing and flanging area.

While the severing operation is taking place as shown in the FIGURE 4, the increase in pressure to the channel 78 will cause the flexible membrane to engage the tubing 22 inside wall and proceed along with the tubing thus eliminating the step of stopping the tubing 22 during container formation operation. From the FIGURE 2, it will be noted that the pressure to the channel 74 forcing the flexible membrane 66 outwardly, would decrease after the desired operation has been performed, which decrease takes place rather suddenly. The movement of the slide 58 continues to the right as shown by the pressure to the channel 78 until such time as the slide 58 reaches its most rightward position of travel at which time the cycle repeats by an increase in pressure to the channel 76 to reverse the direction of the slide 58, which is now from right to left for a repeat operation to another and new section of tubing.

With reference to the FIGURES 6 and 7, and more specifically to the FIGURE 6, two additional embodiments of the slide 58 are shown. To increase the return time of the flexible membrane 66 to its normal or non-expanded position, the flexible membrane 66' has been provided which is similar to the flexible membrane 66 of the FIGURES 3, 4 and 5 except for the addition of a small tip 96 which may be molded to the inside at approximately its center position and at several points about the flexible membrane 66'. The tip 96 would have a small aperture to receive a spring 98. The opposite end of the spring 98 could be secured by the means 100 at a number of positions within the chamber 72 formed under the flexible membrane 66' and to which the channel 74 supplies fluid pressure. It will be understood that a number of springs 98 would be positioned about the inside of the flexible membrane 66', as desired.

Another embodiment shown in the FIGURE 6 results in the elimination of the channel 78 for supplying pressure to advance the slide 58 from left to right. The movement of the slide from left to right is now accomplished by the insertion of a spring 102, such as a coil spring, in the area immediately adjacent the left end of the circular element 60'. Since the positioning of the flexible membrane 66 or 66' under the die 16 is not critical due to the width of the flexible membrane 66 or 66' as compared to the area in which the severing takes place within the die 16, a spring 102 may be selected which would have the proper spring modulus to cause the slide 58 and its return from left to right to approximate in velocity, the velocity of the moving tube 22 and split dies 16 and 18. Thus, the only pressures required in the embodiment of the FIGURE 6 would be the pressure to the channel 76 for the right to left motion of the slide 58 and the pressure to cause the flexible membrane 66' to be driven outwardly forcing the tubing 22 into engagement with the dies 16 and 18.

In the embodiment shown in the FIGURE 7, alternate means are disclosed for causing the right to left return of the slide 58. This means includes the insertion of a spring 104, such as a coil spring, and the elimination of the channel 76 for supplying fluid pressure to return the slide 58 leftwardly. The spring 104 would be positioned within a slot or groove formed in the horn 26 and would abut the longitudinal circular element 60 which comprises the right portion of the slide 58, which slide includes substantially similar, but reversed, elements 60 and 60', joined by the flexible membrane 66 and secured by a suitable clamp 70. A spring 104 could be selected which would have the proper spring modulus for returning the slide 58 immediately upon reduction of pressure in the channel 78. This return resulting from the spring 104 would result in the right to left movement of the slide 58 and immediately with the application of pressure to the channel 78, the left to rightward movement would then result, followed immediately by pressure to the channel 74 to force the flexible membrane 66 into engagement with the tubing 22 and the split dies 16 and 18 for formation of a container 56.

In the aforementioned figures, split dies 16 and 18 have been shown and described which accomplish severing and/ or flanging of the tubing to produce a container 56 having a predetermined length. In the FIGURES 8 and 9, it is proposed that other types of dies may be employed such as the reforming die of the FIGURE 8 (which may be symmetrical as well as non-symmetrical) and an embossing die, such as shown in the FIGURE 9. It will be readily understood that the reforming die and the embossing die may take many different configurations according to the design that is required.

With reference to the FIGURE 8, one-half of a reforming die 106 is shown which in the particular example would produce a container of one diameter which increases outwardly to a second diameter. Conceivably, a reforming die could be employed which produces a container having a cylindrical shape for a portion of a length and a square or rectangular configuration for the remainder of its length. Other configurations will be readily apparent to those skilled in the art.

The embossing die of the FIGURE 9 may take many different configurations and the twist die as shown, is for illustrative purposes only. It will be readily apparent that the configuration of the die 108 of the FIGURE 9 could be one having many designs and including alphabetical, numerical or alpha-numeric characters.

The reforming die 106 of the FIGURE 8 and the embossing die 108 of the FIGURE 9, could be split dies such as the split dies 16 and 18 and could replace the dies 16 and 18 or be included in the system of the FIGURE 1 for performing a reforming or embossing operation before or after the severing and/or flanging as shown in the illustrative figure.

Thus, there has been described a moving hydraulic impulse metal forming device which is extremely efficient and dependable in its operation. The most efficient means for forming containers, involves the formation of the container from a continuously moving strip. The present invention includes means for severing, flanging, reforming, or embossing, etc., which is accomplished upon the tubing without a retardation in its velocity. A pair of moving conveyors transport mating halves of split dies which are in engagement for a portion of their travel. During the portion of the travel in which the split dies are in engagement, the tubing which was just formed from a continuous sheet of material, advances over a stationary horn but within the split dies. The split dies and the tubing advance at substantially identical velocities. A reciprocating slide is supported by the horn within the tubing. Means are positioned upon the reciprocating slide to perform various operations upon the tubing such as severing, flanging, reforming or embossing. In a preferred embodiment, fluid means are utilized to cause the slide to engage the inside of the tubing, and while advancing along with the tubing, force the tubing into engagement with the appropriate die for performing the desired operation. After the operation has been completed, the fluid means will then cause a reversal of the slide so that it returns to a position near the next approaching die. At this point, the reverse motion of the slide is altered and a forward motion is applied so that the means upon the slide again engage the tubing to repeat the aforementioned operation on the tubing for forming the containers. Various embodiments include means for more readily returning the tubing engagement member (a flexible membrane) of the slide to its original position and, in addition, the substitution of springs having desired moduli for advancing or reversing the motion of the slide.

Thus, the present invention may be embodied in other specific forms without departing from the spirit and essential characteristics of our invention. The present embodiment is therefore to be considered in all respects as illustrative and the scope of the invention being indicated by the appended claims rather than the foregoing description, and all changes which come within the meaning and range of the equivalency of the claims are therefore intended to be embraced therein.

What is claimed is:

1. A container forming device comprising means for advancing tubular container material, means for forming material positioned about the material and advanceable with said means for advancing, and means positioned within the material and advanceable therewith for forming the material by causing an engagement of the container material with said means for forming material.

2. A container forming device comprising means for advancing tubular container material, a forming die positioned about the material and advanceable with said means for advancing and means positioned within the material and intermittently advanceable therewith for causing an engagement of the container material with said forming die to form the material in conformity with said die.

3. A container forming device comprising means for advancing tubular container material, a non-symmetrical reforming die positioned about the material and advanceable with said means for advancing and means positioned within the material and intermittently advanceable therewith for causing an engagement of the container material with said non-symmetrical reforming die to form the material in accordance with said die.

4. A container forming device comprising means for advancing tubular container material, an embossing die positioned about the material and advanceable with said means for advancing and means positioned within the material and intermittently advanceable therewith for causing an engagement of the container material with said embossing die to form the material in accordance with said embossing die.

5. A container forming device comprising means for advancing tubular material, means for forming the material positioned about the material and advanceable with said means for advancing, and means positioned within the material and intermittently advanceable therewith for causing an engagement of the material with said means for forming to form the material in accordance with said means for forming, said means positioned within the tubular material including stationary support means, movable means positioned by said support means and means connected to said movable means and actuable transversely thereto for causing the engagement of the material with said means for forming.

6. A container forming device comprising means for advancing tubular material, means for forming the material positioned about the material and advanceable with said means for advancing, stationary support means positioned within the material to be formed, movable means in sliding relationship with said support means, and means supported by said movable means for engaging the material to cause a forming of the material in accordance with the means for forming.

7. A container forming device comprising means for advancing tubular material, means for forming the material positioned about the material and advanceable with said means for advancing, stationary support means positioned within the material to be formed, movable means in sliding relationship with said support means, and means supported by said movable means for selectively engaging the material to cause a depression of the material into said means for forming.

8. A container forming device comprising means for advancing tubular material, means for forming the material positioned about and advanceable with said means for advancing, stationary support means positioned within the material to be formed, movable means in sliding relation with said support means, means supported by said movable means for engaging the material to cause a forming of the material in accordance with the means for forming and means for positioning said means for engaging the material on said movable means within said means for forming.

9. The combination as defined in claim 8 wherein said means for positioning includes a source of pressure and a channel communicating with said movable means.

10. A container forming device comprising means for advancing tubular material, means for forming the material positioned about the material and advanceable with said means for advancing, stationary support means positioned within the material to be formed, movable means in sliding relation with said support means, resilient means supported by said movable means for engaging the material and means for actuating said resilient means to cause a forming of the material in accordance with the means for forming.

11. The combination as defined in claim 10 including a source of pressure and a channel communicating with said resilient means.

12. A container forming device comprising means for advancing tubular material, means for forming the material positioned about the material and advanceable with said means for advancing, stationary support means positioned within the material to be formed, movable means in sliding relationship with said support means, resilient means positioned upon said movable means, means for positioning said resilient means in alignment with said means for forming by actuating said movable means, means to advance said resilient means and said movable means at a rate commensurate with the material and said means for forming and means communicating with said resilient means for abruptly forcing said resilient means against the material and said means for forming.

13. The combination as defined in claim 12 wherein said resilient means surrounds said movable means and is concentric with the material and said means for forming.

14. The combination as defined in claim 12 wherein said means for positioning said resilient means includes a spring.

15. The combination as defined in claim 12 wherein said means to advance said resilient means and movable means is a spring positioned within said support means for urging said movable means.

16. A container forming device comprising means for advancing tubular material, means for forming the material positioned about the material and advanceable with said means for advancing, stationary support means positioned within the material to be formed, movable means in sliding relation with said support means, resilient means positioned upon said movable means, a channel communicating with said movable means through said support means for positioning said resilient means in alignment with said means for forming by actuating said movable means, means for advancing said resilient means and movable means at a rate commensurate with the material and said means for forming, and means communicating with said resilient means for abruptly forcing said resilient means against the material and said means for forming.

17. A container forming device comprising means for advancing tubular material, means for forming the material positioned about the material and advanceable with said means for advancing, stationary support means positioned within the material to be formed, movable means in sliding relation with said support means, resilient means positioned upon said movable means, means for positioning said resilient means in alignment with said means for forming by actuating said movable means, a channel communicating with said movable means through said support means for advancing said resilient means and movable means at a rate commensurate with the material and said means for forming and means communicating with said resilient means for abruptly forcing said resilient means against the material and said means for forming.

18. A container forming device comprising means for advancing tubular material, means for forming the material positioned about the material and advanceable with said means for advancing, stationary support means positioned within the material to be formed, movable means in sliding relation with said support means, resilient means positioned upon said movable means, a first channel communicating with said movable means through said support means for positioning said resilient means in alignment with said means for forming by actuating said movable means, a second channel communicating with said movable means through said support means for advancing said resilient means and movable means at a rate commensurate with the material and said means for forming and means communicating with said resilient means for abruptly forcing said resilient means against the material and said means for forming.

19. The combination as defined in claim 16 wherein said resilient means is an elastomeric material.

20. The combination as defined in claim 16 including means for returning said resilient means to its normal position out of engagement with the material.

21. The combination as defined in claim 18 wherein said means is a spring.

22. A container forming device comprising means for advancing tubular material, means for severing the material and positioned about the material and advanceable with said means for advancing, stationary support means positioned within the material to be severed, movable means in sliding relation with said support means, and means supported by said movable means for intermittently engaging the material to result in a severing of the material in accordance with the means for severing.

23. A container forming device comprising means for advancing tubular material, means for severing and flanging the material and positioned about the material and advanceable with said means for advancing, stationary support means positioned within the material to be severed and flanged, movable means in sliding relation with said support means, and means supported by said movable means for intermittently engaging the material to result in a severing and flanging of the material in accordance with the means for severing and flanging.

24. A container forming device comprising means for advancing tubular material, means for embossing the material and positioned about the material and advanceable with said means for advancing, stationary supporting means positioned within the material to be embossed, movable means in sliding relationship with said supporting means, and means supported by said movable means for intermittently engaging the material to produce embossing of the material in accordance with the means for embossing.

25. A container forming device for forming tubular material comprising a die surrounding the material for both advancing the material and causing a forming operation on the material, stationary supporting means positioned within the material to be formed, movable means in sliding relationship with said supporting means, and means supported by said movable means for intermittently engaging the moving material to cause a forming of the material in accordance with the die.

26. A container forming device comprising means for advancing tubular material, means for forming the material and positioned about the material and advanceable with said means for advancing, stationary support means positioned within the material to be formed, movable means in sliding relationship with said support means, resilient means positioned upon said movable means, means for positioning said resilient means in alignment with said means for forming by actuating said movable means, means to advance said resilient means and movable means at a rate commensurate with the material and said means for forming, means communicating with said resilient means for abruptly forcing said resilient means against the material and said means for forming, and means driven by said means for advancing to selectively actuate said means for positioning, said means to advance, and said means communicating with said resilient means.

27. A method of forming containers comprising the steps of advancing tubular material, positioning a first forming device about the material, advancing the forming device along with the material, intermittently advancing a second forming device within the tubular material, and causing the second forming device to engage the first forming device to produce a forming operation.

28. The method of claim 27 wherein the step of intermittently advancing a second forming device is by the application of fluid pressure to the forming device.

29. A method of forming containers comprising the steps of advancing tubular material, positioning a first forming device about the material, advancing the forming device along with the material, aligning a second forming device positioned within the tubular material with the first forming device, advancing the second forming device at a rate commensurate with the advancement of the tubular material, and causing the second forming device to engage the first forming device to produce a forming operation.

30. A method of severing containers comprising the steps of advancing tubular material, positioning a severing device about the material, advancing the severing device along with the material, aligning a flexible membrane concentric with the severing device, intermittently advancing the flexible membrane at a rate commensurate with the advancement of the tubular material, and causing the flexible membrane to abruptly engage the severing device to produce a severing operation.

31. A method of severing and flanging containers comprising the steps of advancing tubular material, positioning a severing and flanging device about the material, advancing the severing and flanging device along with the material, aligning a flexible membrane concentric with the severing and flanging device, intermittently advancing the flexible membrane at a rate commensurate with the advancement of the tubular material, and causing the flexible membrane to abruptly engage the severing and flanging device to produce a severing and flanging operation.

32. A method of embossing containers comprising the steps of advancing tubular material, positioning an embossing device about the material, advancing the embossing device along with the material, aligning a flexible membrane concentric with the embossing device, intermittently advancing the flexible membrane at a rate commensurate with the advancement of the tubular material, and causing the flexible membrane to abruptly engage the embossing device to produce an embossing operation.

References Cited by the Examiner
UNITED STATES PATENTS

| | | | |
|---|---|---|---|
| 664,045 | 12/1900 | Huber | 72—63 |
| 2,133,445 | 10/1933 | Guerin | 72—55 |

WILLIAM W. DYER, Jr., *Primary Examiner*

LEONIDAS VLACHOS, *Examiner.*